United States Patent
Maenishi et al.

(10) Patent No.: US 10,363,898 B2
(45) Date of Patent: Jul. 30, 2019

(54) AIR-BAG DEVICE

(71) Applicant: AUTOLIV DEVELOPMENT AB, Vargarda (SE)

(72) Inventors: Kai Maenishi, Yokohama (JP); Yutaka Nakajima, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 70 days.

(21) Appl. No.: 15/559,611

(22) PCT Filed: Jan. 8, 2016

(86) PCT No.: PCT/JP2016/050488
§ 371 (c)(1),
(2) Date: Sep. 19, 2017

(87) PCT Pub. No.: WO2016/147684
PCT Pub. Date: Sep. 22, 2016

(65) Prior Publication Data
US 2018/0065587 A1    Mar. 8, 2018

(30) Foreign Application Priority Data
Mar. 19, 2015   (JP) .................. 2015-056933

(51) Int. Cl.
*B60R 21/231*   (2011.01)
*B60R 21/205*   (2011.01)
(Continued)

(52) U.S. Cl.
CPC .......... *B60R 21/231* (2013.01); *B60R 21/205* (2013.01); *B60R 21/2338* (2013.01);
(Continued)

(58) Field of Classification Search
CPC . B60R 21/231; B60R 21/205; B60R 21/2338; B60R 2021/23386;
(Continued)

(56) References Cited

U.S. PATENT DOCUMENTS

| 9,187,055 B1 | 11/2015 | Genthikatti et al. |
| 2015/0343986 A1* | 12/2015 | Schneider ............. B60R 21/205 280/729 |

(Continued)

FOREIGN PATENT DOCUMENTS

| JP | H08324373 A | 12/1996 |
| JP | 2010241241 A | 10/2010 |
| JP | 2016020116 A | 2/2016 |

OTHER PUBLICATIONS

International Search Report of PCT/JP2016/050488, dated Apr. 5, 2016.

*Primary Examiner* — Drew J Brown
(74) *Attorney, Agent, or Firm* — Brinks Gilson & Lione

(57) ABSTRACT

An airbag device capable of restraining an occupant in a stable position even upon an oblique collision and lowering an injury value related to the occupant. The airbag device (100) includes a main bag (112) inflated and deployed in front of a passenger seat (104) in the vehicle, a center bag (114) inflated and deployed on the inner side of the main bag (112) in the vehicle width direction, and upper side joining means (120) that is provided above a valley (128) formed between the main bag (112) and the center bag (114) and that joins the center bag (114) to the main bag (112) for a prescribed range in the vehicle front-back direction.

12 Claims, 9 Drawing Sheets

(51) Int. Cl.
*B60R 21/2338* (2011.01)
*B60R 21/00* (2006.01)
(52) U.S. Cl.
CPC ............. *B60R 2021/0009* (2013.01); *B60R 2021/23107* (2013.01); *B60R 2021/23161* (2013.01); *B60R 2021/23386* (2013.01)
(58) Field of Classification Search
CPC .......... B60R 2021/23161; B60R 2021/23107; B60R 2021/0009
See application file for complete search history.

(56) References Cited

U.S. PATENT DOCUMENTS

| | | | | |
|---|---|---|---|---|
| 2016/0046257 | A1* | 2/2016 | Yamada | B60R 21/2338 |
| | | | | 280/729 |
| 2016/0207490 | A1* | 7/2016 | Yamada | B60R 21/2338 |
| 2016/0297393 | A1* | 10/2016 | Fukawatase | B60R 21/231 |
| 2017/0129439 | A1* | 5/2017 | Taguchi | B60R 21/205 |
| 2018/0029557 | A1* | 2/2018 | Yamada | B60R 21/2338 |
| 2018/0056922 | A1* | 3/2018 | Yamada | B60R 21/205 |
| 2018/0065583 | A1* | 3/2018 | Tabushi | B60R 21/233 |
| 2018/0154857 | A1* | 6/2018 | Yamada | B60R 21/231 |
| 2018/0312131 | A1* | 11/2018 | Jeong | B60R 21/2338 |
| 2018/0345901 | A1* | 12/2018 | Yamada | B60R 21/2338 |

\* cited by examiner

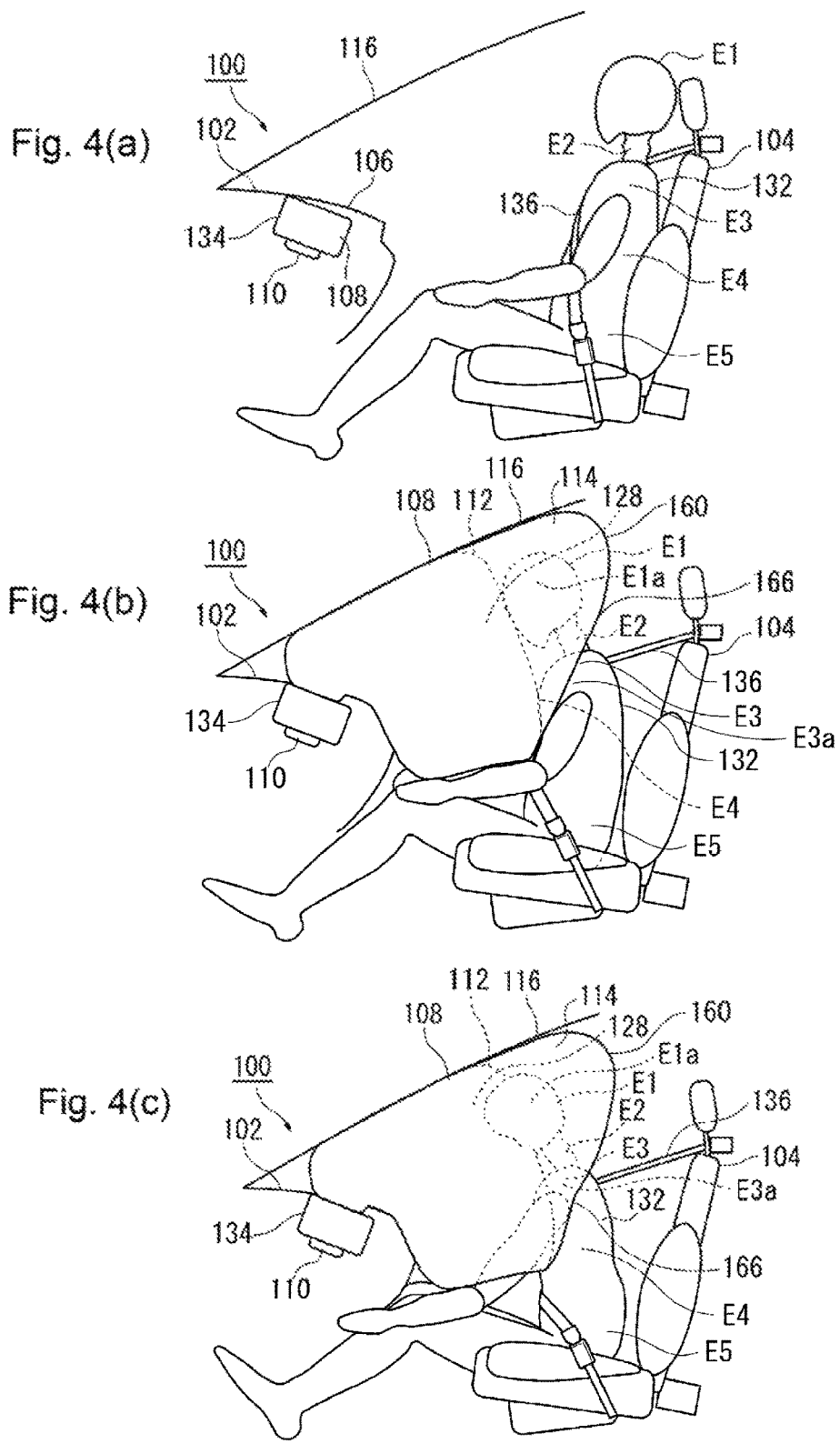

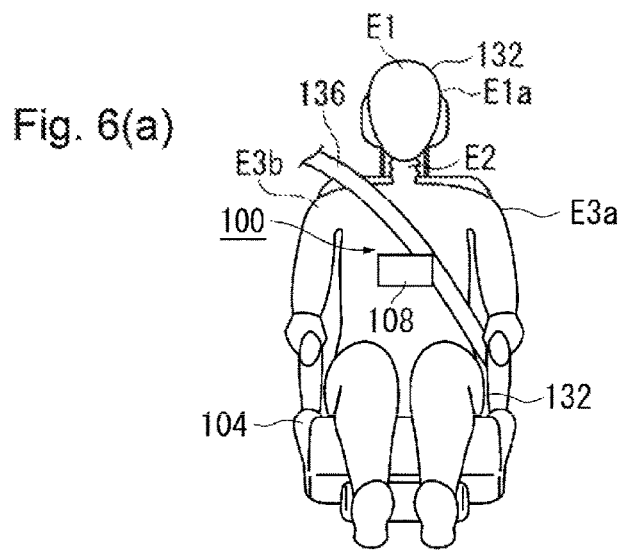
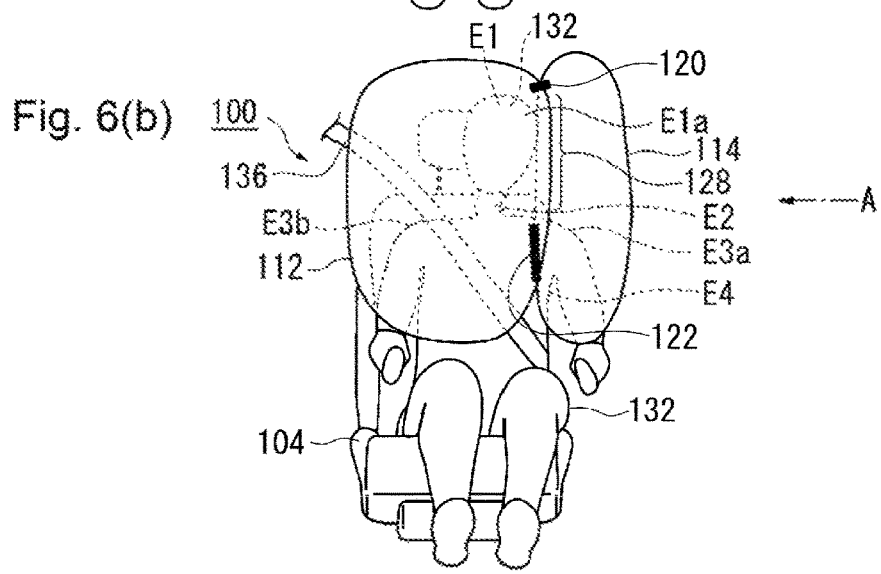
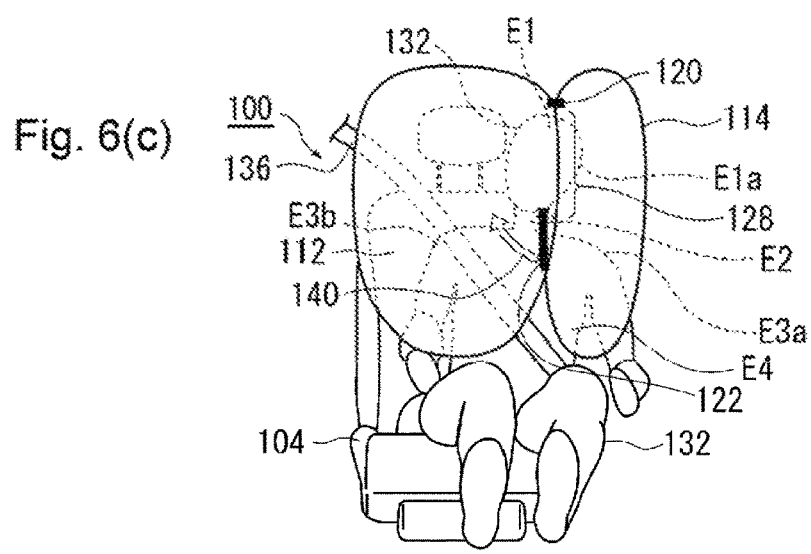

VIEW FROM ARROW A

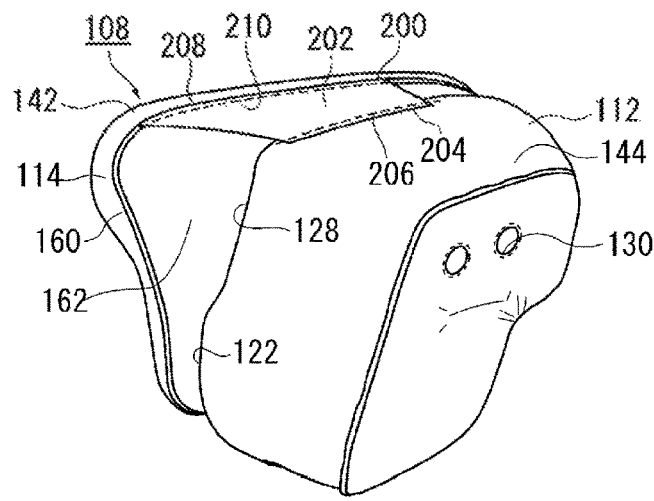
Fig. 8(a)
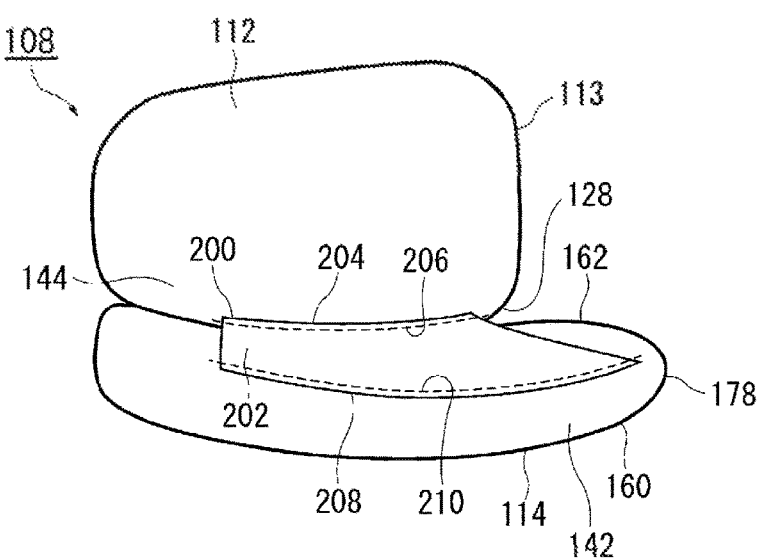
Fig. 8(b)
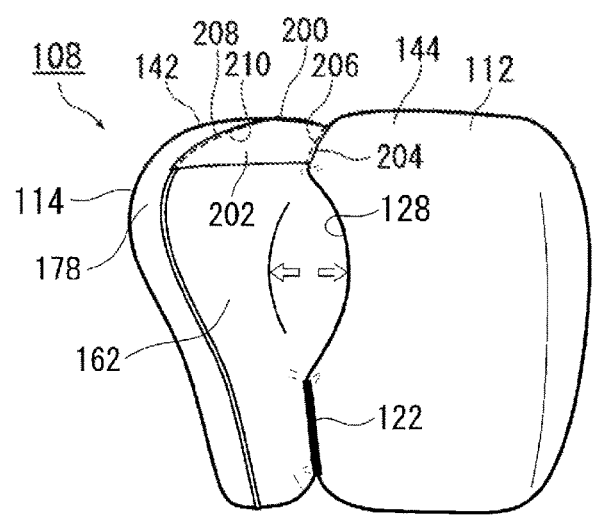
Fib. 8(c)

AIR-BAG DEVICE

CROSS-REFERENCE TO RELATED APPLICATIONS

This application is a 35 U.S.C. § 371 national phase application of International Application No.: PCT/JP2016/050488, filed Jan. 8, 2016, which claims the benefit of priority under 35 U.S.C. § 119 to Japanese Patent Application No.: 2015-056933, filed Mar. 19, 2015, the contents of which are incorporated herein by reference in their entirety.

FIELD OF THE INVENTION

The present invention relates to an airbag device that restrains an occupant in a vehicle from the front side of the vehicle.

BACKGROUND

In recent years, airbag devices have become standard equipment for most vehicles. The airbag device is a safety device activated in an emergency event such as a vehicle collision and inflated and deployed by gas pressure to receive and protect an occupant. There are different kinds of airbag devices for various installation locations or uses. For example, a front airbag or frontal impact airbag is provided in the center of the steering at the driver's seat in order to protect the occupant of the front seat against an impact given mainly in the front-back direction, and a passenger airbag is provided at the instrument panel or other locations near a front passenger seat. In addition, a curtain airbag that is inflated and deployed along the side windows is provided at the wall part near the roof in order to protect occupants of the front and back seats against a side collision (or side impact) and a subsequent roll over (turn over), and a side airbag that is inflated and deployed just beside an occupant is provided at a side of each seat.

An airbag disclosed in Japanese Patent Application Publication No. 2003-335203 is mainly for a front passenger seat and configured to restrain an occupant between two bag-shaped parts. More specifically, referring to the above-referenced application, the airbag includes a flat shaped left half airbag 12 and a right half airbag 14, and a space part between these airbags is positioned in front of the seat. The left half airbag 12 and the right half airbag 14 are connected by a tie panel 16 positioned on the vehicle rear side and never apart more than necessary. As a result of the configuration, the airbag disclosed in in the above-referenced document allows an occupant to enter, to a suitable extent, the space part in front and to be received therein.

Today, the airbag devices must cope with irregular collisions or impacts such as a so-called oblique collision that applies an impact on a vehicle obliquely in the front-back direction. In an oblique collision, an occupant enters an airbag cushion (hereinafter referred to as a "cushion") present in front of the seat in an irregular behavior such as movement in an oblique direction. In the configuration disclosed in the above-mentioned reference, the space part positioned in front of the seat receives the occupant, and therefore the occupant cannot efficiently be restrained in an oblique collision. In order to provide sufficient restraining capability upon an oblique collision, a cushion in a form or structure suitable therefor must be provided, and the cushion must also be kept in an optimal position.

The present invention is in consideration of the problem and it is an object of the present invention to provide an airbag device capable of restraining an occupant in a stable position even upon an oblique collision and lowering an injury value related to the occupant.

SUMMARY

In order to solve the above-described problem, an exemplary configuration of an airbag device according to the present invention restrains an occupant in a vehicle, and the airbag device includes a main bag inflated and deployed in front of a front seat in the vehicle, a center bag inflated and deployed on an inner side of the main bag in a vehicle width direction, and upper side joining means that is provided above a valley formed between the main bag and the center bag and that joins the center bag to the main bag for a prescribed range in a vehicle front-back direction.

In the configuration, when an occupant enters obliquely forward for example upon an oblique collision, the head of the occupant is guided into the valley between the main bag and center bag and restrained while a side head part is in contact with the center bag. In the case, since the center bag is joined to the main bag by the upper side joining means, the center bag is prevented from moving to the vehicle inner side toward the main airbag and the valley can be kept narrow. Therefore, the center bag side can restrain the head of the occupant more efficiently with high restraining capability and lower the injury value.

The upper side joining means is provided in the vehicle front-back direction for a prescribed range. The head of the occupant may move in the vehicle front-back direction when the occupant is restrained, and the upper side joining means provided in the vehicle front-back direction is desirable because, upon contacting the upper side joining means, the head is given only a little amount of resistance therefrom.

The airbag device may restrain the head of the occupant on a vehicle rear side of the valley. In this way, the airbag device can efficiently restrain the head of the occupant and potentially lower the injury value.

The center bag may be inflated and deployed so as to protrude to the vehicle rear side beyond the main bag. As described above, in an oblique collision, the occupant of the front passenger seat may move obliquely forward on the vehicle inner side. In this case, if the head of the occupant contacts a conventional main bag present in front of the front passenger seat, clockwise rotation around the neck when viewed from above may be generated at the head. Therefore, for example in the above-described configuration, the center bag provided on the vehicle inner side of the main bag is caused to protrude to the vehicle rear side beyond the main bag. In the configuration, the head of the occupant moving obliquely forward on the vehicle inner side contacts the center bag mainly from the side head part the moment or immediately before or after the head contacts the main bag in front. In this way, the clockwise rotation of the occupant's head can be reduced or prevented. In particular, the angular speed of the rotation of the occupant's head can be reduced, and therefore the injury value of the occupant associated with the rotation can be lowered.

The upper side joining means may be provided by sewing or other joining techniques. In the configuration, the center bag may optimally be joined to the main bag for a prescribed range in the vehicle front-back direction.

The upper side joining means may include a fabric tether that is elongated in the vehicle front-back direction, a first joint that joins a first long side of the tether on a vehicle outer side to the main bag, and a second joint that joins a second long side of the tether on a vehicle inner side to the center bag. In the configuration, the center bag may optimally be joined to the main bag for a prescribed range in the vehicle front-back direction.

The second long side may extend to the vehicle rear side beyond the first long side, and the second joint may extend as far as an upper rear end of the center bag. In the configuration, the position of the center bag can efficiently be stabilized up to the upper rear end, so that the restraining capability of the center bag can be increased for the entire range.

The airbag device may further include lower side joining means that is provided under the valley and joins the main bag and the center bag on the vehicle rear side for a prescribed range. The valley needs only be provided in a location that can be contacted by the head of the occupant, and the main bag and the center bag are joined by the lower side joining means below the valley, so that the chest or the like of the occupant may optimally be restrained.

The lower side joining means may be provided by sewing or other joining techniques. In the configuration, the lower parts of the center bag and the main bag can optimally be joined to each other.

The main bag may contact a windshield of the vehicle and an upper surface part of an instrument panel of the vehicle by being inflated and deployed. More specifically, the main bag may be inflated and deployed between the windshield and the instrument panel. In the configuration, the main bag can be in a stable position when the occupant enters the main bag, so that the position of the center bag joined to the main bag by the upper side joining means may be more stabilized.

The airbag device may further include a housing that has a box shape, stores the main bag and the center bag, and is provided inside an upper surface part of an instrument panel of the vehicle, and the main bag and the center bag may tear open the upper surface part of the instrument panel to be inflated and deployed. In the configuration, an airbag device for a front seat can be implemented in an optimum manner with high occupant restraining performance. In particular, the upper side joining means provided in the vehicle front-back direction is desirable because interior components, etc. of the vehicle are unlikely to come thereunder.

According to the present invention, an airbag device capable of restraining an occupant in a stable position even upon an oblique collision and lowering an injury value related to the occupant can be provided.

BRIEF DESCRIPTION OF THE DRAWINGS

FIGS. 4(a), 4(b), and 4(c) are exemplary views of the process of how the cushion in FIG. 1(b) restrains an occupant.

FIGS. 6(a), 6(b), and 6(c) are exemplary views of the process of how the cushion in FIGS. 5(a) to 5(c) restrains the occupant when viewed from the front side of the vehicle.

FIGS. 8(a), 8(b), and 8(c) are exemplary views of a modification of upper side joining means illustrated for example in FIG. 3(a).

DETAILED DESCRIPTION OF THE INVENTION

Figure 1A:
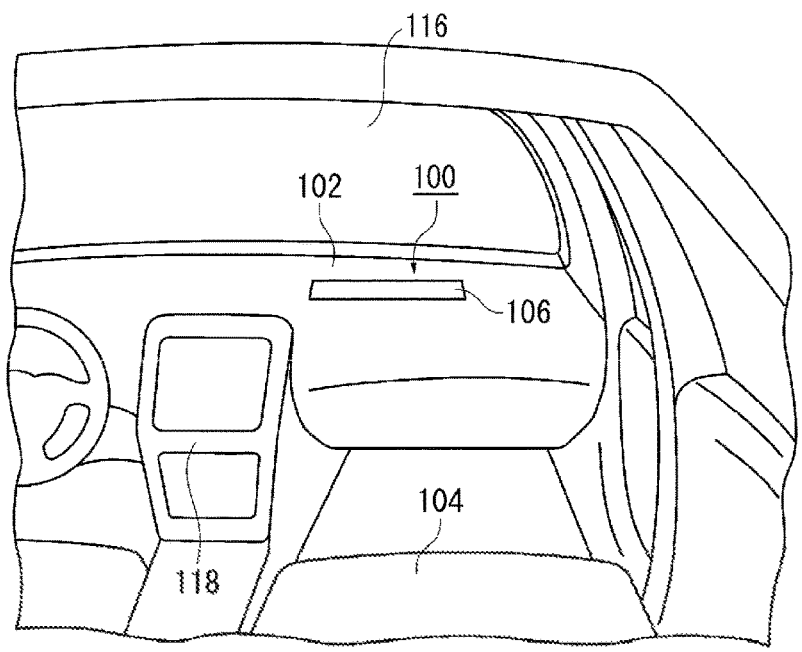
FIGS. 1(a) and 1(b) are exemplary views showing a general configuration of an airbag device according to an embodiment of the present invention.

Now, a preferred embodiment of the present invention will be described in detail with reference to the accompanying drawings. The sizes, materials, and other specific numerical values in the description of the embodiment are simply examples for better understanding of the invention, and do not limit the present invention unless otherwise specified. Note that in the description and drawings, elements having substantially the same functions and configurations are designated by the same reference characters, and their description will not be repeated, while element that are not directly relevant to the present invention are not shown.

Figure 1B:
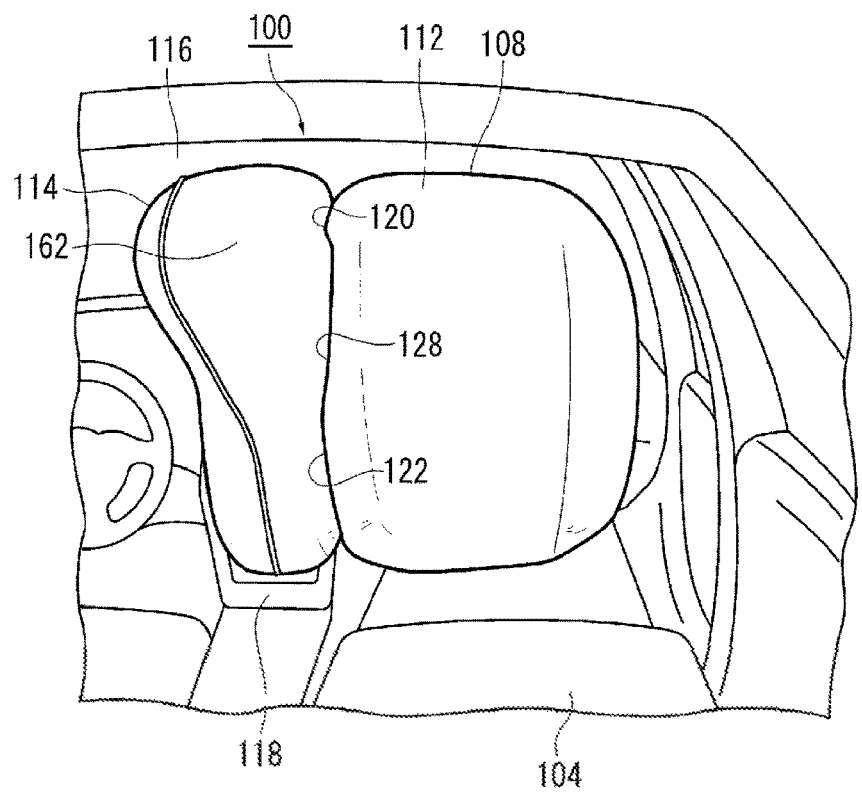

FIGS. 1(a) and 1(b) are exemplary views of a general configuration of an airbag device 100 according to an embodiment of the present invention. FIG. 1(a) is an exemplary view of a vehicle before the airbag device 100 is activated. According to the embodiment, the airbag device 100 is implemented as a configuration for a front seat, particularly for a front passenger seat (right side seat in the front) in a left-hand drive vehicle. The airbag device 100 is provided inside the upper surface part 106 of an instrument panel 102 on the side of a front passenger seat 104.

In the airbag device 100, a cushion 108 (see FIG. 1(b)) tears open the upper surface part 106 to be inflated and deployed to the rear side in the vehicle in response to an impact detection signal received from a sensor that is not shown. FIG. 1(b) is an exemplary view of the vehicle after the airbag device 100 is activated. The cushion 108 of the airbag device 100 restrains the occupant 132 (see FIG. 4(a)) of the front passenger seat 104 from the front side of the vehicle. The cushion 108 is in a bag shape and inflated and deployed by gas supplied from an inflator 110 (see FIG. 4(a)). The cushion 108 is formed by, for example, placing on one another a plurality of base pieces of fabric that form the surface of the cushion 108 and sewing or adhering together the pieces of ground fabric, or by weaving using OPW (One-Piece Woven).

The cushion 108 of the airbag device 100 includes two parts, a main bag 112 and a center bag 114. The main bag 112 is a part that is inflated and deployed in front of the front passenger seat 104 and has a larger capacity. The main bag 112 is inflated and deployed to fill the space among the occupant 132 of the front passenger seat 104, the instrument panel 102, and a windshield 116. In this way, the occupant 132 is restrained from contact with the instrument panel 102. The occupant 132 is also restrained from contact with the windshield 116, so that the occupant 132 can be restrained from being ejected from the vehicle.

The center bag 114 is a flat part that is inflated and deployed on the vehicle inner side of the main bag 112 and has a smaller capacity than the main bag 112. The center bag 114 is inflated and deployed in front of a center console 118 with respect to the occupant 132 (see FIG. 5(a)) and prevents the occupant 132 from moving to the vehicle inner side or hitting the center console 118 for example upon an oblique collision.

Figure 2A:
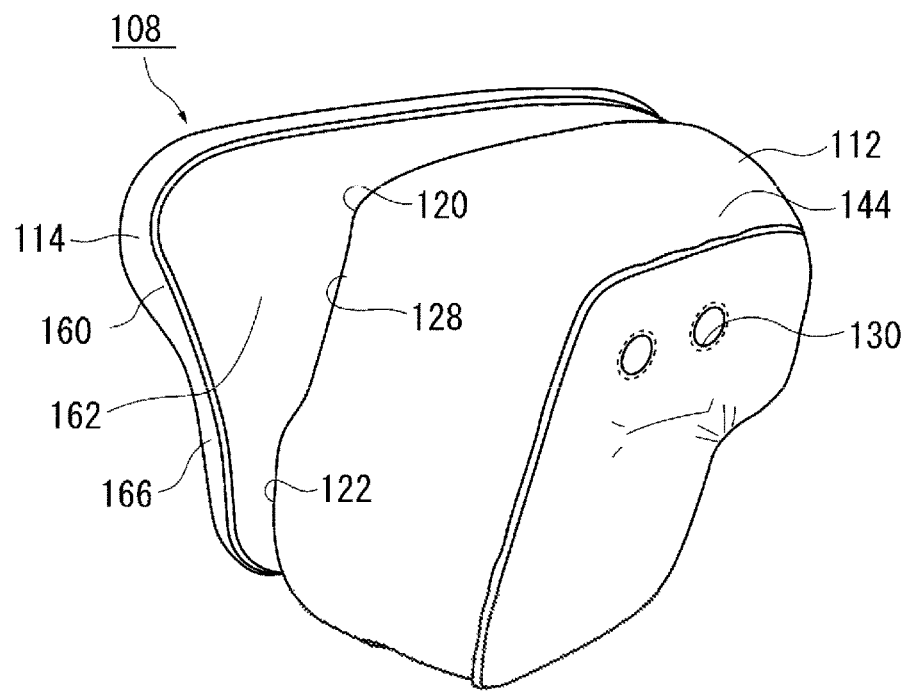
FIGS. 2(a) and 2(b) are exemplary views of the cushion in an inflated and deployed state in FIG. 1(b) when viewed in different directions.

FIGS. 2 and 3 are exemplary views of the cushion 108 in an inflated and deployed state in FIG. 1(b) when viewed in different directions. FIG. 2(a) is an exemplary perspective view of the cushion 108 in FIG. 1(b) when viewed from above and the outside of the vehicle. A valley 128 is formed between the center bag 114 and the main bag 112. The valley 128 separates the center bag 114 and the main bag 112 on the rear side of the vehicle. The valley 128 restrains the occupant 132 (see FIG. 5(a)) particularly by the head E1. According to the embodiment, the center bag 114 and the main bag 112 are connected for example by an internal vent hole on the vehicle front side of the valley 128. However, the center bag 114 and the main bag 112 may be provided as independent bags.

Two vent holes 130 are provided on a side surface of the main bag 112 on the vehicle outer side. The vent hole 130 is a so-called exhaust hole adapted to discharge gas supplied from the inflator 110 (see FIG. 4(a)) to the outside. While only the side window and other elements are present on the vehicle outer side of the main bag 112, the occupant 132 (see FIG. 4(a)) is not present in the position, and therefore it is effective to provide the vent holes 130 on the side surface of the main bag 112 on the vehicle outer side.

Figure 2B:
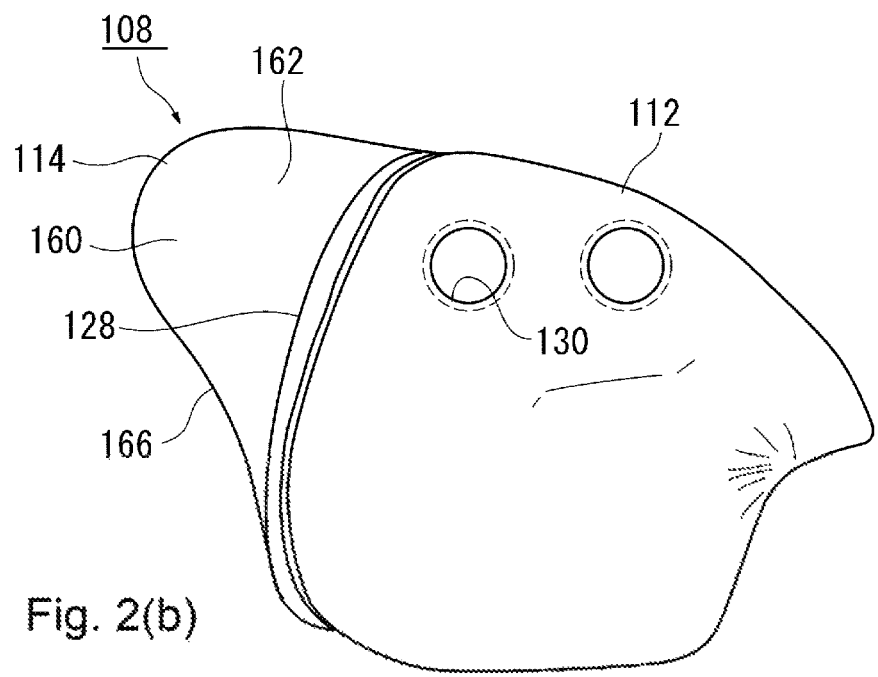

FIG. 2(b) is an exemplary view of the cushion 108 in FIG. 2(a) when viewed from the vehicle outer side. As illustrated in FIG. 2(b), in the center bag 114 according to the embodiment, a rear region 160 on the rear side of the vehicle is inflated and deployed so as to protrude to the vehicle rear side (to the left side in FIG. 2(b)) beyond the main bag 112. Therefore, the side surface of the center bag 114 on the vehicle outer side is exposed from the valley 128. The center bag 114 restrains the side head part E1a of the occupant 132 (see FIG. 4(a)) mainly by a side surface part 162 on the vehicle inner side. The center bag 114 is joined to the main bag 112 for example by upper side joining means 120 that will be described, and therefore the center bag 114 can function as a reaction force surface that restrains the side head part E1a.

Figure 3A:
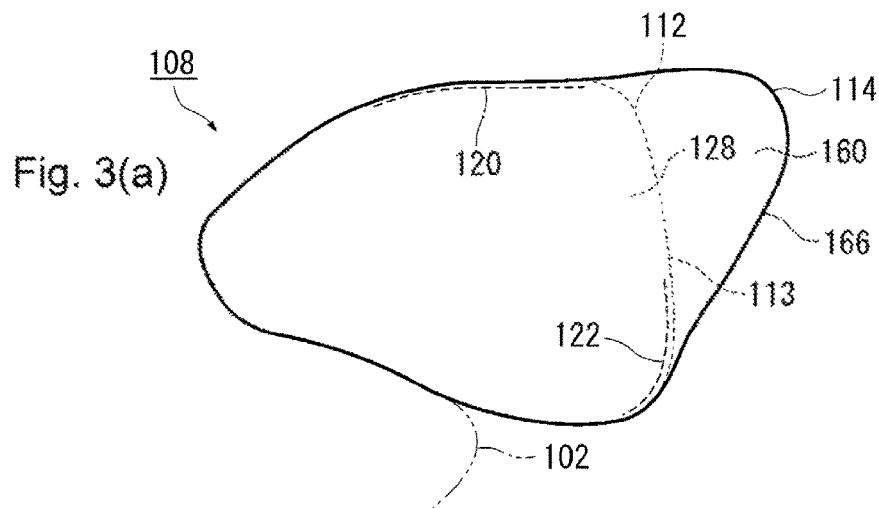
FIGS. 3(a), 3(b), and 3(c) are exemplary views of the cushion in the inflated and deployed state in FIG. 1(b) when viewed in different directions.

FIG. 3(a) is an exemplary view of the cushion 108 in FIG. 2(b) when viewed from the vehicle inner side. In FIG. 3(a), the part of the main bag 112 hidden behind the center bag 114 is indicated by the broken line. As illustrated in FIG. 3(a), the upper side joining means 120 is provided above the valley 128. The upper side joining means 120 joins the center bag 114 and the main bag 112, and is provided by sewing according to the embodiment. The center bag 114 is flat-shaped and inflated and deployed backward from above the instrument panel 102 and can be kept in a stable position without moving to the vehicle inner side since the center bag is joined to the main bag 112 by the upper side joining means 120.

Figure 3B:
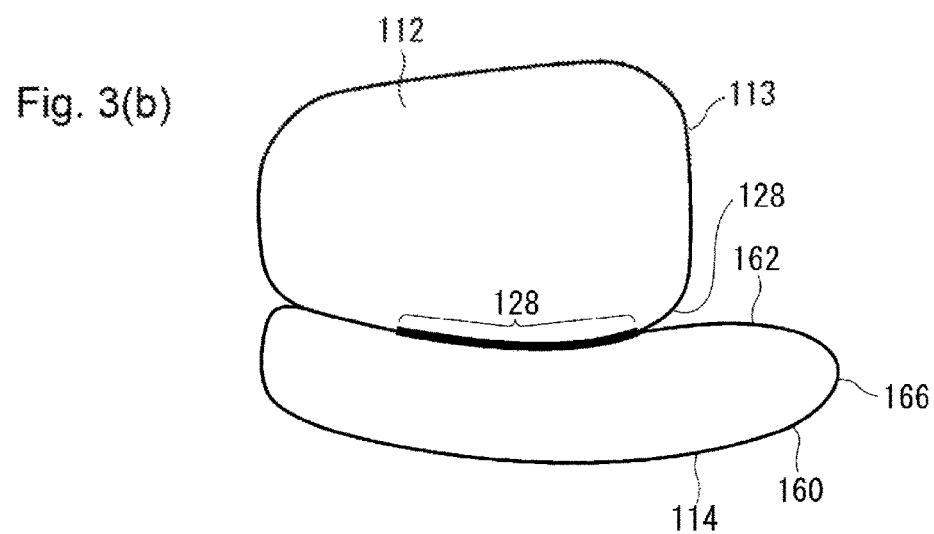

FIG. 3(b) is an exemplary view of the cushion 108 in FIG. 3(a) when viewed from above the vehicle. As illustrated in FIG. 3(b), the upper side joining means 120 is provided by sewing together the center bag 114 and the main bag 112 for a prescribed range in the vehicle front-back direction. The center bag 114 can restrain the occupant 132 (see FIG. 4(a)) without being separated from the main bag 112 by the presence of the upper side joining means 120 though the valley 128 is formed between the center bag 114 and the main bag 112.

The range for providing the upper side joining means 120 may be set as appropriate. For example, the upper side joining means 120 may function sufficiently when provided above the part not joined (i.e., the range of the valley 128) if the center bag 114 and the main bag 112 are connected inside on the front side of the vehicle. The upper side joining means 120 may be provided for the entire range of the upper part of the main bag 112 in the front-back direction of the vehicle if the center bag 114 and the main bag 112 are formed as independent bags or partly connected. In any of the cases, the upper side joining means 120 can improve the occupant restraining capability by the main bag 112 to a greater extent for a prescribed range in the vehicle front-back direction.

Referring back to FIG. 3(a), lower side joining means 122 is provided under the valley 128. The lower side joining means 122 also connects the main bag 112 and the center bag 114 by sewing. The lower side joining means 122 is provided to conform to the rear edge 113 of the main bag 112 mainly for a prescribed range in the up-down direction. The presence of the lower side joining means 122 can keep the center bag 114 from losing its position and falling to the vehicle inner side. Note that the lower side joining means 122 and the upper side joining means 120 may be provided by adhesion or thermal deposition other than by sewing.

Figure 3C:
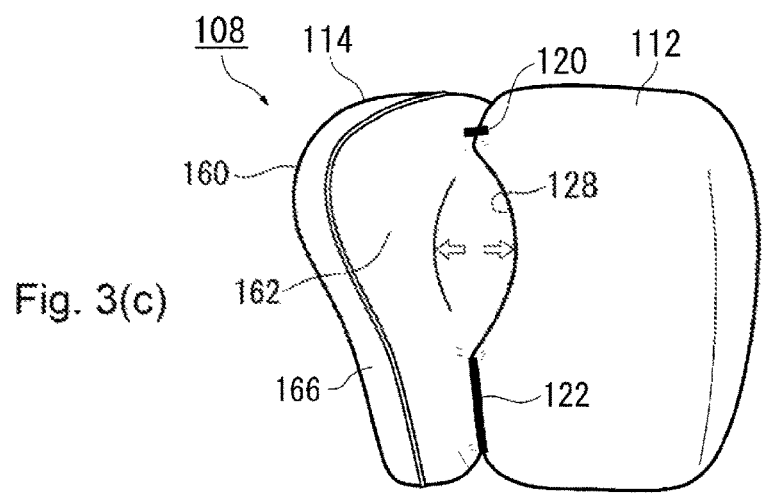

FIG. 3(c) is an exemplary view of the cushion 108 in FIG. 3(b) when viewed from the rear side of the vehicle. In FIG. 3(c), the center bag 114 and the main bag 112 are provided with force in the vehicle width direction from the inside of the valley 128, so that the valley 128 is opened. The valley 128 is a part that mainly functions to restrain the head E1 of the occupant 132 (see FIG. 4(a)). During the process, the upper side joining means 120 and the lower side joining means 122 also function optimally to support the center bag 114, so that the center bag in contact with the occupant 132 can be prevented from moving to the vehicle inner side. Therefore, the center bag 114 can efficiently apply reaction force from the side surface part 162 on the occupant 132.

FIGS. 4(a) to 4(c) are exemplary views of the process of how the cushion 108 in FIG. 1(b) restrains the occupant 132. In the figures included in FIGS. 4(a) to 4(c), the left side corresponds to the front side of the vehicle. FIG. 4(a) is an exemplary view of the cushion 108 yet to be deployed. As illustrated in FIG. 4(a), the cushion 108 includes the main bag 112 (see FIG. 4(b) or the like) and the center bag 114 and is stored in a housing 134 in a folded state. The housing 134 has for example a box shape having its upper side opened, stores the folded cushion 108, and is provided inside the upper surface part 106 of the instrument panel 102.

The inflator 110 is fixed at the bottom surface of the housing 134. The inflator 110 is a gas generator connected to the main bag 112 to supply gas. For example, a disk-shaped inflator is available as the inflator 110 while a cylinder type inflator may be used. Examples of inflators widely available at present include an inflator filled with a gas generating agent to generate gas by burning the gas generating agent, an inflator filled with compressed gas to supply the gas without heat generation, and a hybrid type inflator configured to use both combustion gas and compressed gas. Any of these inflators may be used as the inflator 110.

The inflator 110 is activated in response to an impact detection signal from a sensor that is not shown and supplies gas to the main bag 112. The main bag 112 and the center bag 114 are connected inside and the gas supplied to the main bag 112 from the inflator 110 is also supplied to the center bag 114.

FIG. 4(b) is an exemplary view of the cushion 108 in an inflated and deployed state. The cushion 108 tears open the upper surface part 106 of the instrument panel 102 that serves as a cover for the housing 134 and is inflated and deployed to the vehicle rear side. The occupant 132 illustrated in FIG. 4(b) has entered further on the side of the cushion 108 from the occupant 132 in FIG. 4(a). In an emergency event such as a vehicle collision, the occupant 132 moves forward in the vehicle by the inertia. When the occupant 132 wears a seatbelt 136 and the hips E5 are restrained, the occupant 132 moves along a track as if the upper half of the body leans forward around the hips E5.

The main bag 112 mainly restrains the head E1, the shoulders E3, and the chest E4 of the occupant 132. The main bag 112 in an inflated and deployed state is in contact with the windshield 116 and the upper surface part 106 of the instrument panel 102. The main bag 112 is inflated and deployed between the windshield 116 and the instrument panel 102 and therefore can restrain the occupant 132 in a stable position when the occupant 132 enters the main bag.

The center bag 114 protrudes to the vehicle rear side (to the right side in FIG. 4(b)) beyond the main bag 112. Upon an oblique collision, the occupant 132 may move obliquely forward on the vehicle inner side, particularly from the left shoulder E3a that is not restrained by the seatbelt 136. In this case, the occupant 132 contacts the center bag 114 from the side head part E1a.

FIG. 4(c) is an exemplary view of the state in which the occupant 132 has further entered the cushion 108 from the state shown in FIG. 4(b). As illustrated in FIG. 4(c), the head E1 of the occupant 132 is guided into the valley 128 while the side head part E1a is in contact with the center bag 114 and restrained by the valley 128. In addition, the left shoulder E3a of the occupant 132 on the vehicle inner side is restrained by the rear end 166 of the rear region 160 of the center bag 114. The rear end 166 is inclined to gradually protrude upward to the vehicle rear side. The rear end 166 of the rear region 160 restrains the left shoulder E3a from the front side of the vehicle and supports the upper half of the body of the occupant 132 together with the main bag 112. In this way, the twisting of the upper half of the body of the occupant 132 is cancelled.

When the side head part E1a and the left shoulder E3a of the occupant 132 contact the center bag 114, the upper side joining means 120 and the lower side joining means 122 optimally function. The upper side joining means 120 and the lower side joining means 122 join the center bag 114 to the main bag 112. Therefore, if the occupant 132 enters obliquely forward upon, for example, an oblique collision, the center bag 114 is prevented from moving to the vehicle inner side and can restrain the side head part E1a and the left shoulder E3a in a stable position with high restraining capability.

Figure 5A:
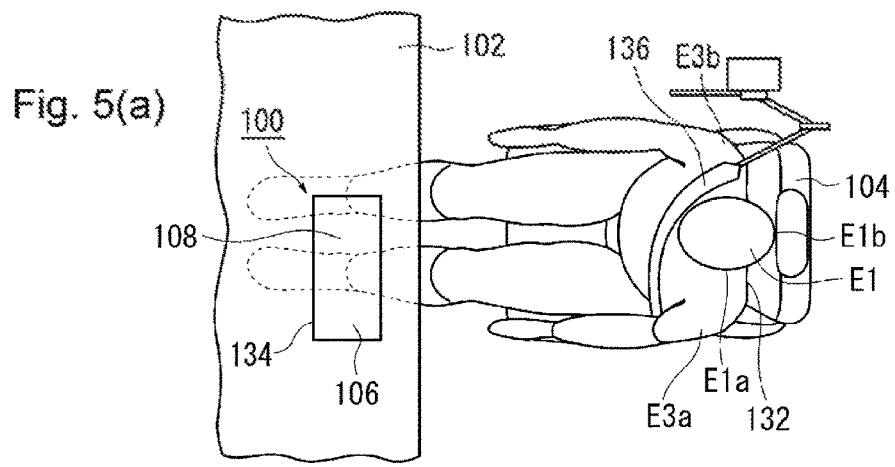
FIGS. 5(a), 5(b), and 5(c) are exemplary views of the process of how the cushion in FIGS. 4(a), 4(b), and 4(c) restrains the occupant when viewed from above.
Figure 5B:
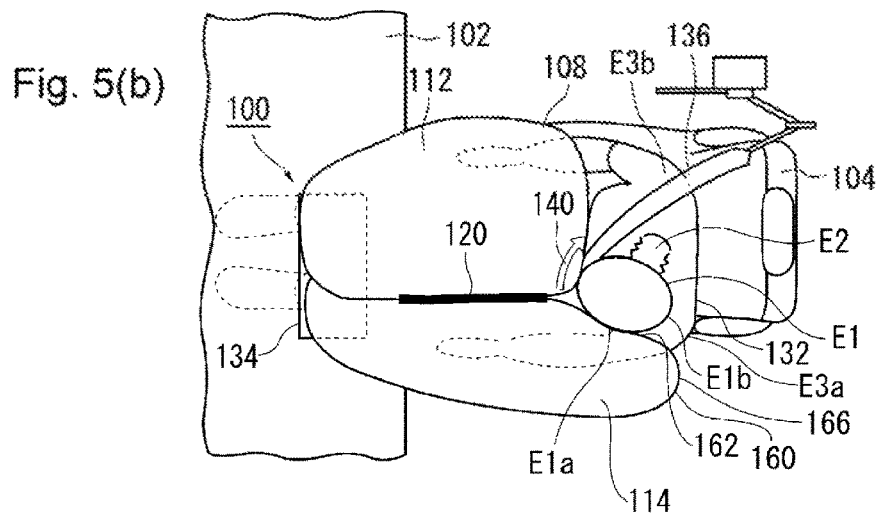
Figure 5C:
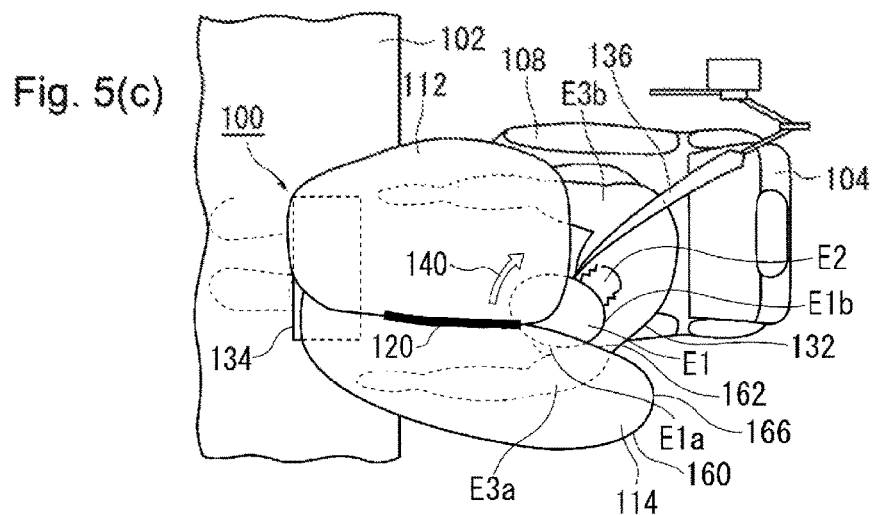

FIGS. 5(a) to 5(c) are exemplary views of how the cushion 108 in FIGS. 4(a) to 4(c) restrains the occupant 132 when viewed from above. FIGS. 5(a) to 5(c) correspond to FIGS. 4(a) to 4(c), respectively. With reference to FIGS. 5(a) to 5(c), the process of how the cushion 108 restrains the occupant 132 will be described.

Assume that the occupant 132 of the front passenger seat 104 wears the seatbelt 136 and is seated as illustrated in FIG. 5(a). If an impact is inflicted on the vehicle in this state, an activation signal is transmitted to the airbag device 100 from a sensor that is not shown, and the cushion 108 is inflated and deployed as shown in FIG. 5(b). In an oblique collision, the occupant 132 moves obliquely forward on the vehicle inner side. According to the embodiment, the center bag 114 protrudes to the vehicle rear side beyond the main bag 112, and the head E1 of the occupant 132 contacts the side surface part 162 of the center bag 114 on the vehicle outer side from the side head part E1a.

FIG. 5(c) shows the state in which the occupant 132 has further entered the cushion 108 from the state in FIG. 5(b).

When the head E1 of the occupant 132 moving obliquely forward contacts the main bag 112 present in front of the front passenger seat 104, clockwise rotation force (rotation 140 indicated by the arrow) around the neck E2 when viewed from above may be generated at the head E1. Therefore, according to the embodiment, the rear region 160 of the center bag 114 provided on the vehicle inner side of the main bag 112 is extended to the vehicle rear side beyond the main bag 112. In addition, the valley 128 is provided between the main bag 112 and the center bag 114.

In this configuration, the head E1 of the occupant 132 moving obliquely forward on the vehicle inner side enters the valley 128 to be restrained while the side head part E1a is in contact with the center bag 114. In particular, according to the embodiment, the center bag 114 is joined to the main bag 112 by the upper side joining means 120 and the lower side joining means 122. Therefore, the center bag 114 can restrain the head E1 without losing its position and efficiently reduce or cancel the rotation 140 generated at the head E1. In the configuration, the angular speed of the rotation 140 of the head E1 of the occupant 132 can be reduced and an injury value of the head E1 associated with the rotation 140 can be reduced.

The upper side joining means 120 is provided to extend for a prescribed range in the vehicle front-back direction. The upper side joining means 120 is positioned above the head E1 of the occupant 132 and may be contacted by the head E1 of the occupant 132 moving in the front-back direction of the vehicle when the occupant is restrained. However, the upper side joining means 120 extends to the vehicle front side beyond the range of the valley 128 in which the head E1 may enter and does not contact the head E1 from the front in the moving direction, so that only a small amount of resistance is given to the head E1. Furthermore, the occupant 132 may move to the vehicle rear side after being restrained by the cushion 108, but the presence of the upper side joining means 120 provided in the vehicle front-back direction allows the contacting head E1 to be guided and moved smoothly to the vehicle rear side. The upper side joining means 120 provided at the upper part of the cushion 108 may contact other parts of the vehicle such as interior components, etc. in the vicinity of the upper surface part 106 (FIG. 5(a)) that closes the housing 134 and the windshield 116 (FIG. 4(c), etc.). If this happens, the configuration is optimal in that the other parts are unlikely to come under the upper side joining means 120 that is elongated in the vehicle front-back direction.

The rear region 160 of the center bag 114 restrains the left shoulder E3a of the occupant 132 by the rear end 166. The occupant 132 is restrained by the seatbelt 136 from the right shoulder E3b on the vehicle outer side to the flank on the vehicle inner side, but the left shoulder E3a is not restrained by the seatbelt 136. Therefore, in an oblique collision, the occupant may move forward in the vehicle from the left shoulder E3a. If this happens, the rear end 166 of the center bag 114 restrains the left shoulder E3a from the front and from above, and then the main bag 112 restrains the right shoulder E3b. According to the embodiment, in particular, since the upper side joining means 120 and the lower side joining means 122 join the center bag 114 to the main bag 112, the center bag 114 can also optimally restrain the left shoulder E3a.

As in the foregoing, according to the embodiment, using the center bag 114 supported by the upper side joining means 120 and the lower side joining means 122, the side head part E1a can be restrained to reduce the angular speed of the rotation 140 of the head E1. In addition, the left shoulder E3a is actively restrained and the rotation generated at the upper half of the body can be cancelled. In particular, if the heavy head E1 of the occupant 132 contacts the center bag 114 from the vehicle outer side, the center bag 114 can be kept from being much apart from the main bag 112, so that the valley 128 can be kept narrow, and the head E1 can be restrained with high restraining capability. Therefore, the injury value of the occupant 132 can efficiently be lowered.

According to the embodiment, as described with reference to FIG. 4(b), the main bag 112 is inflated between the instrument panel 102 and the windshield 116 and is in a stable position. The center bag 114 is joined to the main bag 112 by the upper side joining means 120 and the lower side joining means 122, and therefore the center bag 114 can be kept from being much apart from the main bag 112 and can be kept in a more stable position.

As described with reference to FIG. 5(b), etc., the occupant 132 starts to contact the cushion 108 as the side head part E1a contacts the center bag 114. However, the occupant 132 may contact the cushion 108 in various manners. For example, the head E1 may contact the center bag 114 and the main bag 112 simultaneously or the head E1 contacts the main bag 112 first. The shoulders E3 (see FIG. 4(b), etc.) or the chest E4 may contact the main bag 112 or the like, and then the head E1 may contact the main bag 112 or the like in some cases. However, in any of the cases, in the configuration according to the embodiment, the head E1 of the occupant 132 can be guided into the valley 128 and effectively restrained therein.

In FIG. 5(b), the rotation generated at the head E1 is the clockwise rotation 140 by way of illustration. However, at a front passenger seat in a right-hand drive vehicle, anti-clockwise rotation around the neck when viewed from above may be generated at the head E1. With the cushion 108 according to the embodiment, the anti-clockwise rotation may also be reduced or cancelled using the valley 128, and the angular speed of the head E1 can be reduced. More specifically, the airbag device 100 according to the embodiment can provide equally advantageous effects with respect to clockwise rotation and anti-clockwise rotation generated at the head E1.

The process in which the cushion 108 restrains the occupant 132 when viewed in different directions will be described. FIGS. 6(a) to 6(c) are exemplary views of the process of how the cushion 108 in FIGS. 4(a) to 4(c) restrains the occupant 132 when viewed from the front side of the vehicle. Assume that the occupant 132 wearing the seatbelt 136 is seated at the passenger seat 104 as illustrated in FIG. 6(a). If there is an impact on the vehicle in the state, the main bag 112 is inflated and deployed in front of the occupant 132 as illustrated in FIG. 6(b), and the center bag 114 is inflated and developed in front of the occupant 132 on the vehicle inner side (on the right side in FIG. 6(b)).

As illustrated in FIG. 6(b), the occupant 132 moves obliquely forward on the vehicle inner side from the seated position and has the side head part E1a contact the side surface part 162 of the center bag 114. In addition, the left shoulder E3a that is not restrained by the seatbelt 136 is restrained by the rear end 166 (see FIG. 4(b)) of the rear region 160 of the center bag 114. Then, as illustrated in in FIG. 6(c), the head E1 is guided forward in the vehicle by the center bag 114 to enter the valley 128 and is restrained by the valley 128. In this case, the center bag 114 is joined to the main bag 112 by the upper side joining means 120 and the lower side joining means 122, and therefore the center bag 114 can restrain the head E1 of the occupant 132 without moving to the vehicle inner side.

Figure 7:
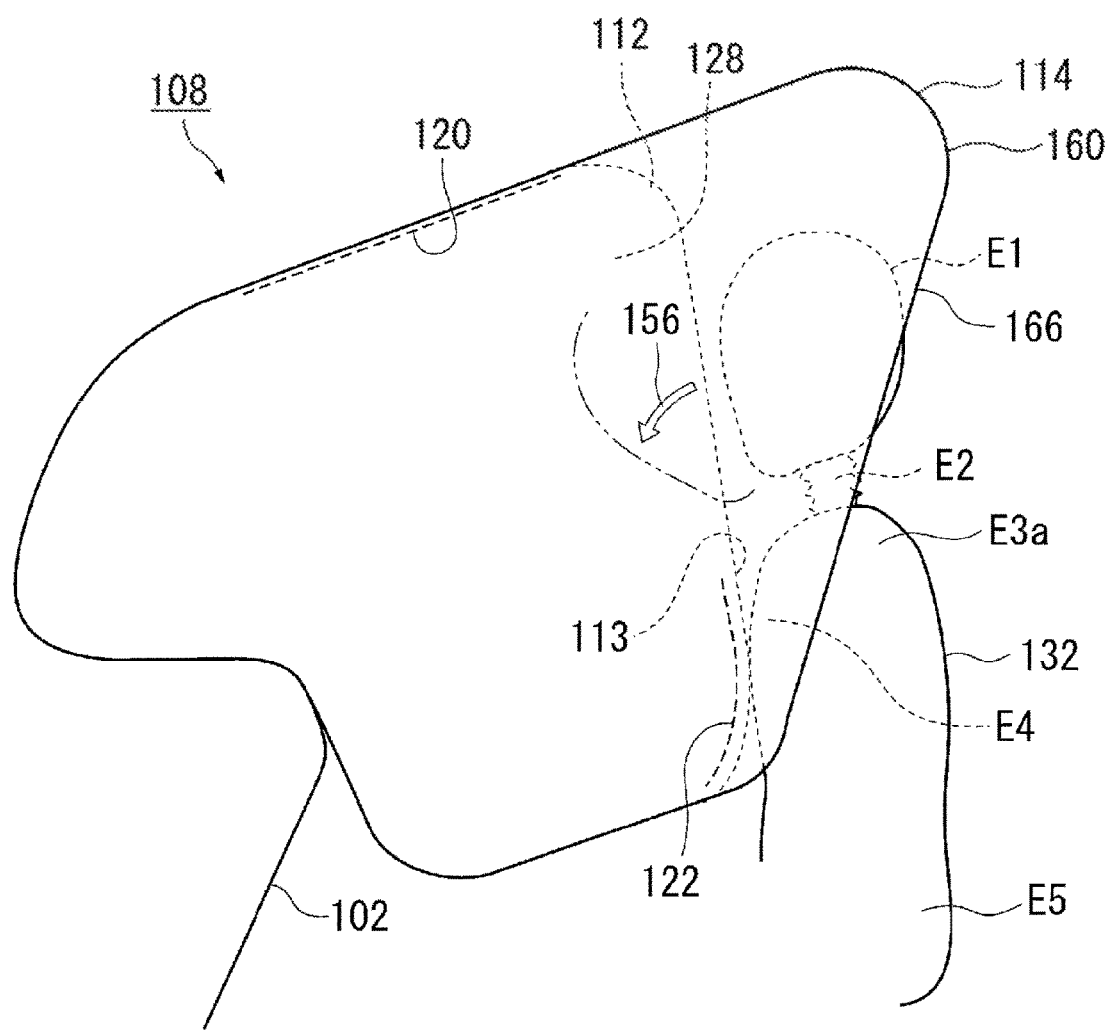
FIG. 7 is a schematic view of the cushion in FIG. 6(b), viewed from an arrow A.

FIG. 7 is a schematic view of the cushion 108 in FIG. 6(c), viewed from an arrow A. As illustrated in FIG. 7, the upper half of the body of the occupant 132 moves forward in the vehicle to rotate mainly around the hips E5 when there is an impact on the vehicle. At the time, the head E1 of the occupant 132 moves along a downward track 156 from the seated position in addition to the forward movement in the vehicle. According to the embodiment, the upper side joining means 120 and the lower side joining means 122 are positioned in consideration of the track 156 of the head E1.

The upper side joining means 120 and the lower side joining means 122 join the center bag 114 and the main bag 112 to define the edge of the valley 128. According to the embodiment, the valley 128 is provided in a position that can be contacted by the head E1 of the occupant 132. Stated differently, the upper side joining means 120 and the lower side joining means 122 are provided in a position that is not contacted by the head E1 of the occupant 132. For example, the upper side joining means 120 is provided above the position that is contacted by the head E1 of the occupant 132. The lower side joining means 122 is provided below the position that is contacted by the head E1 of the occupant 132 and the track 156 generated for the head E1 and in a position contacted by the shoulders E3 and the chest E4. In the configuration, the cushion 108 can optimally restrain the head E1 by the valley 128 without letting the head contact the upper side joining means 120 and the lower side joining means 122.

According to the embodiment, the lower side joining means 122 is provided to extend substantially in the up-down direction along the rear edge 113 of the main bag 112. In this way, the lower parts of the main bag 112 and the center bag 114 are integrated under the valley 128, so that the shoulders E3, the chest E4 and the like of the occupant 132 can be restrained. However, the lower side joining means 122 may be provided in a different direction. The lower side joining means 122 may be provided so that the shoulders E3, the chest E4 and the like of the occupant 132 may be received easily and may be provided to be gradually inclined upward to the front side of the vehicle.

In the configuration described above, the cushion 108 can optimally restrain the head E1 of the occupant 132, particularly the side head part E1a by the center bag 114. In particular, the center bag 114 is supported by the upper side joining means 120 and the lower side joining means 122, and therefore the head E1 can be restrained as far as a part slightly behind the center of the gravity of the head in a stable position and with high restraining capability. In addition, the left shoulder E3a of the occupant 132 is restrained on the lower side of the rear end 166 of the center bag 114 in the vicinity of the lower side joining means 122 from the front and from above. In the configuration, the rotation 140 that may be generated at the head E1 of the occupant 132 and the rotation of the upper half of the body can be reduced, so that the injury value of the occupant 132 can significantly be lowered.

FIGS. 8(a), (b), and (c) are exemplary views of a modification of the upper side joining means 120 illustrated for example in FIG. 3(a). Upper side joining means 200 illustrated in FIG. 8(a) is different from the upper side joining means 120 in FIG. 3(a) in that the former includes a tether 202.

The tether 202 is a fabric member elongated in the vehicle front-back direction and may be made from the same ground fabric as the cushion 108. The tether 202 is sewed to the upper parts of the center bag 114 and the main bag 112 in the vehicle front-back direction to connect these bags together.

FIG. 8(*b*) is an exemplary view of the cushion 108 in FIG. 8(*a*) when viewed from the upper side of the vehicle. As illustrated in FIG. 8(*b*), the tether 202 is elongated in the vehicle front-back direction (in the left-right direction in FIG. 8(*b*)) and has long sides on both sides in the vehicle width direction (in the up-down direction in FIG. 8(*b*)). A first long side 204 on the vehicle inner side (the upper side in FIG. 8(*b*)) is connected to the upper part 144 of the main bag 112 by a first joint 206. The second long side 208 on the vehicle outer side is connected to the upper part 142 of the center bag 114 by a second joint 210. These first and second joints 206 and 210 are provided by sewing but may be provided by adhesion, thermal deposition, etc.

The second long side 208 extends to the vehicle rear side (to the left in the figure) beyond the first long side 204. The second joint 210 is provided by extending the second long side 208 as far as the upper rear end 178 of the center bag 114. In the configuration, the center bag 114 is pulled by the tether 202 to the side of the main bag 112 as far as the upper rear end 178 and thus supported by the tether when the center bag is inflated and deployed.

FIG. 8(*c*) is an exemplary view of the cushion 108 in FIG. 8(*b*) when viewed from the vehicle rear side. In FIG. 8(*c*), force is applied on the center bag 114 and the main bag 112 in the vehicle width direction from the inner side of the valley 128 similarly to FIG. 3(*c*), so that the valley 128 is spread open. When the head E1 of the occupant 132 (see FIG. 9) enters the valley 128, the upper side joining means 200 supports the center bag 114 so that the center bag does not move to the vehicle inner side. In this way, reaction force from the side surface part 162 can efficiently be applied to the occupant 132.

Figure 9:
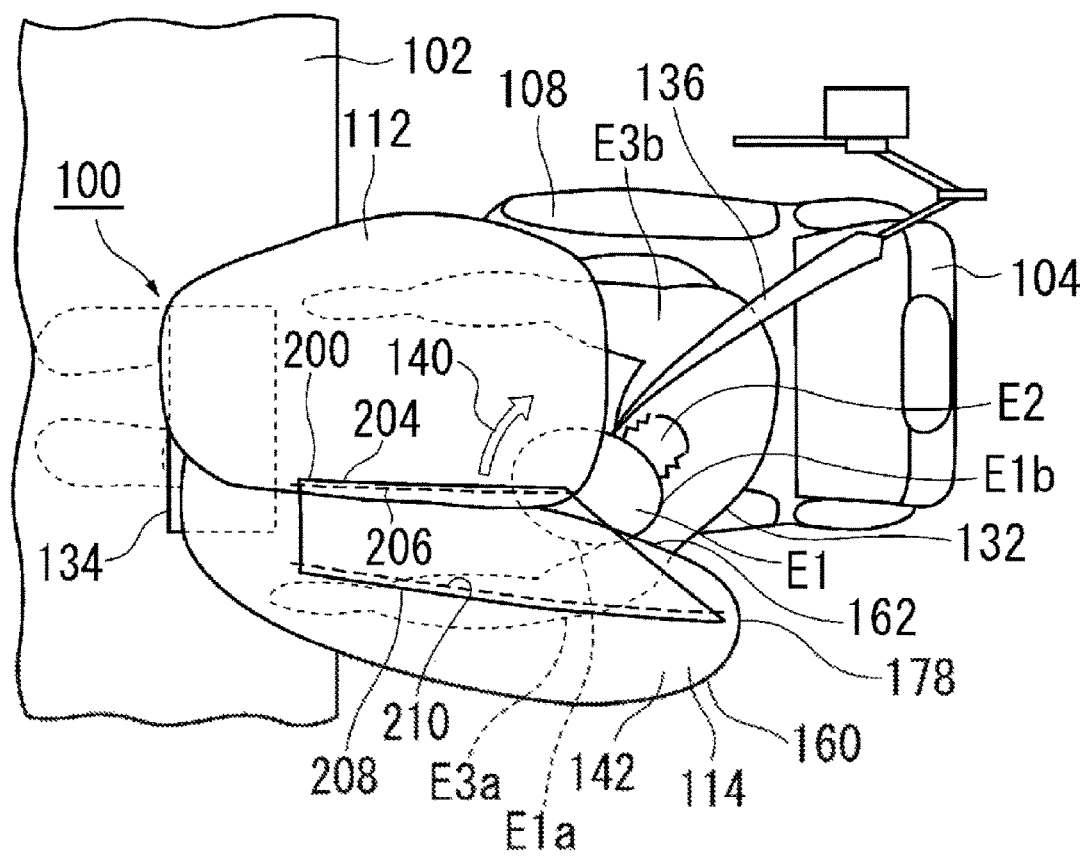
FIG. 9 is an exemplary view of the case in which an occupant is restrained by the cushion in FIG. 8(b).

FIG. 9 is an exemplary view of the case in which the cushion 108 in FIG. 8(*b*) restrains the occupant 132. FIG. 9 corresponds to FIG. 4(*c*). As illustrated in FIG. 9, since the tether 202 joins the center bag 114 to the main bag 112, the center bag 114 hardly loses its position. In particular, the tether 202 is joined to the center bag 114 as far as the upper rear end 178. Therefore, the center bag 114 has its position stabilized as far as the upper rear end 178 and can provide high restraining capability entirely in the vehicle front-back direction. For example, the center bag 114 can restrain the occupant 132 from the side head part E1*a* to the rear head part E1*b*.

In this way, when the occupant 132 contacts the center bag 114, the upper side joining means 200 can prevent the center bag 114 from moving, so that the valley 128 can be kept narrow. Therefore, the cushion 108 provided with the upper side joining means 200 can also efficiently restrain the occupant 132 for example upon an oblique collision, and the injury value can be lowered.

The tether 202 has a length extended to the front side of the vehicle beyond the range of the valley 128 in which the head E1 can enter. The tether 202 is extended in a planar shape with respect to the head E1, and the head E1 is given only a little amount of resistance therefrom if the head E1 contacts the tether. When the restrained head E1 moves toward the vehicle rear side, the planar tether 202 in contact with the head E1 can guide and move the head smoothly to the vehicle rear side. The tether 202 provided above the cushion 108 may contact other parts of the vehicle such as the upper surface part 106 (see FIG. 4(*a*)) that closes the housing 134 and interior components in the vicinity of the windshield 116. However, the tether 202 according to the embodiment is elongated in the vehicle front-back direction, and therefore such other parts are unlikely to come thereunder.

The shape of the tether 202 may be changed as appropriate. For example, the tether 202 may be provided to have a length for covering the upper parts of the center bag 114 and the main bag 112 in the range in which these bags are not connected (i.e., the range of the valley 128). The tether 202 may be provided to cover the entire range of the upper parts of the center bag 114 and the main bag 112 in the vehicle front-back direction regardless of whether the center bag 114 and the main bag 112 are partly connected or formed as independent bags. The restraining capability by the center bag 114 can be set to be increased partly or for the entire range as appropriate by changing the length of the tether 202.

The tether 202 may have an increased or reduced width in the vehicle width direction. The width of the valley 128 may be increased or reduced by changing the width of the tether 202 in the vehicle width direction. The restraining capability in restraining the head E1 can be increased or, conversely, the load can be reduced by changing the width of the valley 128.

Note that according to the modification, only the upper side joining means 200 is provided with the tether 202, but the lower side joining means 122 may also include a tether. More specifically, the lower parts of the center bag 114 and the main bag 112 on the vehicle rear side may be joined or the center bag 114 and the main bag 112 may be joined on the vehicle lower side in the vehicle front-back direction using a tether in a prescribed shape.

While the preferred embodiment of the present invention has been described with reference to the accompanying drawings, the same is a preferable example of the invention, and other embodiments may be carried out or achieved by various other methods. In particular, specific shapes, sizes, configurations, and positional arrangements of components in the accompanying drawings should not be construed as limiting the invention unless otherwise specified herein. The expressions and terms used herein are for the purpose of description and should not be taken as limitative unless otherwise specified.

Therefore, it is to be understood that modifications and variations will be apparent to those skilled in the art within the scope of claims and that the modifications and variations naturally fall within the technical scope of the present invention.

The invention claimed is:

1. An airbag device for restraining an occupant in a vehicle, comprising:
    a main bag adapted to be inflated and deployed in front of a front seat in the vehicle;
    a center bag adapted to be inflated and deployed on an inner side of the main bag in a vehicle width direction; and
    an upper side joining means that is provided above a region of the airbag device intended for restraining the head of the occupant and above a valley formed between the main bag and the center bag and for joining the center bag to the main bag for a prescribed range in a vehicle front-back direction, the prescribed range in the vehicle front-back direction extending further toward a vehicle rear side than portions of the valley, the valley positioned to receive the head of the occupant in an oblique impact condition.

2. The airbag device according to claim 1, further comprising wherein the airbag device is adapted to restrain the head of the occupant on a vehicle rear side of the valley.

3. The airbag device according to claim 1, further comprising wherein the center bag is adapted to be inflated and deployed so as to protrude to the vehicle rear side beyond the main bag.

4. The airbag device according to claim 1, further comprising wherein the upper side joining means is provided by sewing.

5. The airbag device according to claim 1, further comprising a lower side joining means that is provided under the valley for joining the main bag and the center bag on the vehicle rear side for a prescribed range.

6. The airbag device according to claim 5, further comprising wherein the lower side joining means is provided by sewing.

7. The airbag device according to claim 5, further comprising the main bag and the center bag are separated in the valley between the upper side joining means and the lower side joining means.

8. The airbag device according to claim 1, further comprising wherein the main bag contacts a windshield of the vehicle and an upper surface part of an instrument panel of the vehicle by being inflated and deployed.

9. The airbag device according to claim 1, further comprising a housing that has a box shape which stores the main bag and the center bag, and is provided inside an upper surface part of an instrument panel of the vehicle, wherein
the main bag and the center bag tear open the upper surface part of the instrument panel to be inflated and deployed.

10. The airbag device according to claim 1, further comprising the main bag and the center bag are separated in the valley below the upper side joining means.

11. An airbag device for restraining an occupant in a vehicle, comprising:
   a main bag adapted to be inflated and deployed in front of a front seat in the vehicle;
   a center bag adapted to be inflated and deployed on an inner side of the main bag in a vehicle width direction; and
   an upper side joining means that is provided above a valley formed between the main bag and the center bag and for joining the center bag to the main bag for a prescribed range in a vehicle front-back direction,
   wherein the upper side joining means further includes;
   a fabric tether that is elongated in the vehicle front-back direction,
   a first joint that joins a first long side of the tether on a vehicle outer side to the main bag, and
   a second joint that joins a second long side of the tether on a vehicle inner side to the center bag.

12. The airbag device according to claim 11, further comprising wherein
   the second long side extends to a vehicle rear side beyond the first long side, and
   the second joint extends as far as an upper rear end of the center bag.

* * * * *